Sept. 23, 1952     C. B. TALLEY     2,611,388
VALVE

Filed March 11, 1947     2 SHEETS—SHEET 1

INVENTOR.
Chester B. Talley:
BY *Victor J. Evans & Co.*
ATTORNEYS

Sept. 23, 1952         C. B. TALLEY         2,611,388
VALVE

Filed March 11, 1947         2 SHEETS—SHEET 2

INVENTOR.
Chester B. Talley;
BY Victor J. Evans & Co.
ATTORNEYS

Patented Sept. 23, 1952

2,611,388

UNITED STATES PATENT OFFICE 2,611,388
VALVE

Chester B. Talley, Smackover, Ark.

Application March 11, 1947, Serial No. 733,860

1 Claim. (Cl. 137—463)

My present invention relates to an improved valve and more particularly to an automatic valve especially adapted for use in gas mains so that in the event of failure of gas pressure the valve will be closed and which may be opened only by manual effort to prevent the escape of gas from unlighted burners when the pressure returns.

In the accompanying drawings I have illustrated one complete example of the physical embodiment of my invention according to the best mode I have thus far devised but it will be understood that various changes and alterations may be made in the exemplified structure within the scope of the appended claim.

In the drawings—

Figure 1:
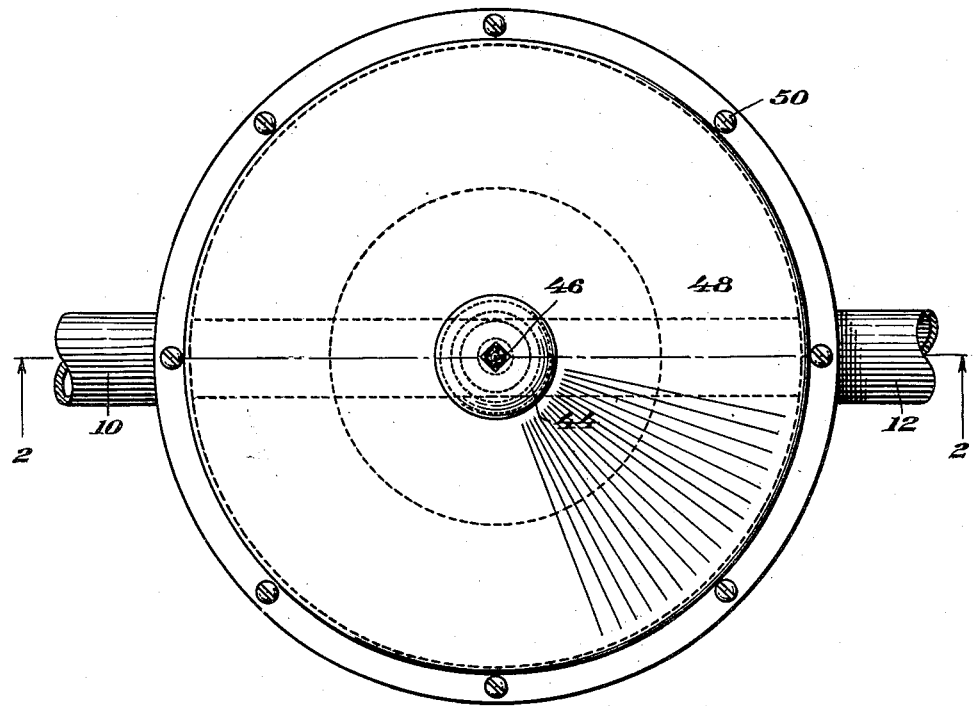
Figure 1 is a top plan view of the valve of my invention.
Figure 2:
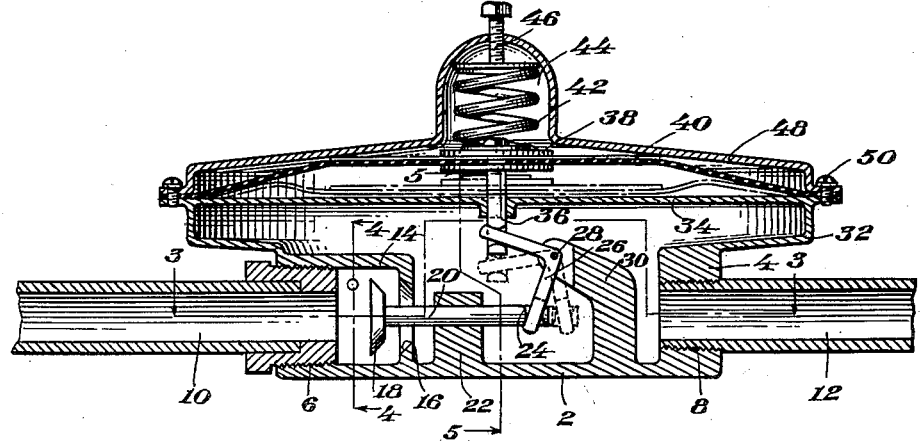
Figure 2 is a transverse vertical sectional view at line 2—2 of Figure 1.
Figure 3:
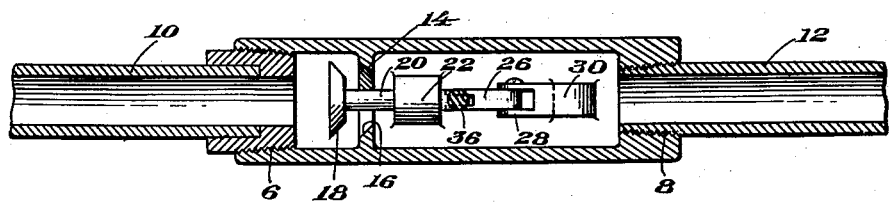
Figure 3 is a sectional view at line 3—3 of Figure 2.
Figure 4:
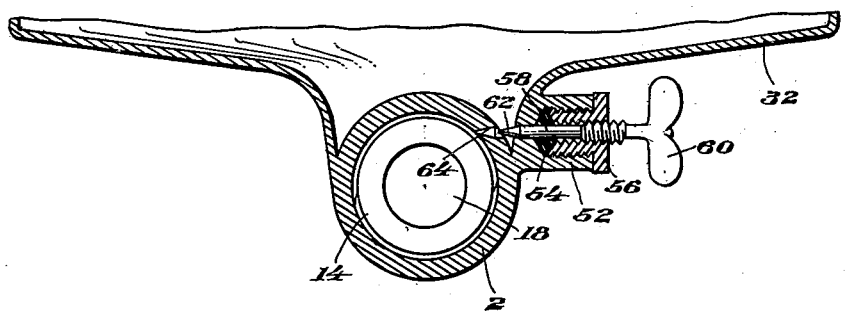
Figure 4 is a sectional view at line 4—4 of Figure 2.
Figure 5:
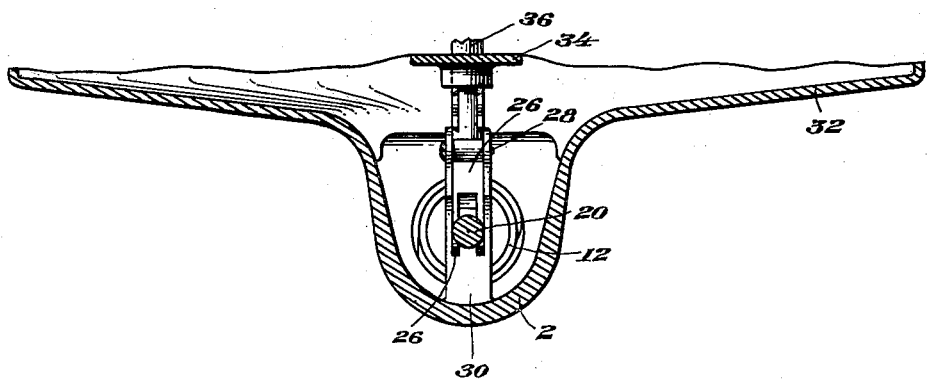
Figure 5 is a sectional view at line 5—5 of Figure 2.

Referring now to the drawings in detail I employ in the valve of my invention a valve body with a base 2 having a wall 4 which is tapped at 6 and 8 for reception of the inlet pipe 10 and the outlet pipe 12.

Within the base I provide a wall 14 forming a chamber having an opening 16 for the valve 18 the stem 20 of which is slidable in the support 22. The free end of the stem is slotted at 24 to receive the crank 26 pivoted at 28 in the abutment 30 in the base.

A housing 32 is formed with a spider frame 34 and the rod 36 having a collar 38 has secured thereon a diaphragm of flexible material, and the spring 42 in the dome 44 of the housing is adjustable by means of the set screw 46 to set the position of the diaphragm.

The cover 48 is secured to the housing by means of screws 50 in peripheral flanges of the cover and housing and the periphery of the diaphragm is secured therebetween. In addition a cylinder or boss 52 extends from the side of the base and encloses packing 54 which is held by a nut 56 providing a packing gland.

A needle valve 58 which is threaded in the nut 56 extends through the boss engaging the wall 14 of the inlet chamber and a handle 60 is provided on the outer end of the stem thereof to adjust the position of the needle valve. The valve stem is tapered at 62 for co-action with the tapered port 64 in the wall 14 so that a flow of gas in small quantities may be permitted if desired.

In operation with the set screw 46 in adjusted position, the needle valve is opened manually whereby pressure from the pipe 10 enters the inner chamber of the base and moves the diaphragm upwardly. The diaphragm actuates the bell crank 26 and opens the valve 18 whereby the gas under pressure from pipe 10 will pass unobstructedly through the base and housing. The valve 62 is closed and the gas continues to flow through the valve body until the supply of gas is exhausted or the pressure reduced. However should the flow of gas under pressure reach a predetermined minimum as set by the set screw 46, the spring 42 will snap down the diaphragm to pivot the crank and close the valve. Thus a cut off of pressure will not result in the passage of gas through such appliances as may have been in operation at the time of failure of pressure, and gas will not be permitted to flow again through the valve until the valve 62 is opened by hand.

Having thus fully described my invention what I claim as new and desire to secure by Letters Patent is:

In a pressure control valve, a valve body including a base, said base including a wall provided with a fluid inlet and outlet opening, a wall member interposed between said pair of openings and defining a chamber, there being an opening in said wall member, a support formed integrally with said base, a stem slidably mounted in said support and extending through the opening in said wall member, a valve mounted on an end of said stem and positioned in said chamber and mounted for movement into and out of closing relation with respect to the opening in said wall member, the other end of said stem being provided with a slot, a crank having one end pivotally connected to the slotted end of said stem, an abutment formed integrally with said base, a pin pivotally connecting said crank to said abutment, a housing including a spider frame, a rod arranged centrally of said frame, the other end of said crank being connected to said rod, a collar mounted on said rod, a diaphragm arranged in engagement with said collar, a dome formed on said housing, a coil spring seated in said dome and engaging said diaphragm, set screw means for adjusting the position of said diaphragm, a cover having its periphery detachably connected to the periphery of said housing, a cylinder extending from one side of said base adjacent said chamber, and a needle valve extending through said cylinder and a port in said chamber wall, said port communicating with said chamber and the interior of said housing.

CHESTER B. TALLEY.

REFERENCES CITED

The following references are of record in the file of this patent:

UNITED STATES PATENTS

| Number | Name | Date |
|---|---|---|
| 619,206 | Murphy | Feb. 7, 1899 |
| 1,033,700 | Hustead | July 23, 1912 |
| 1,247,638 | Carr | Nov. 27, 1917 |
| 1,460,900 | Harris | July 3, 1923 |
| 1,712,346 | Homesley | May 7, 1929 |
| 1,791,980 | Shea | Feb. 10, 1931 |

FOREIGN PATENTS

| Number | Country | Date |
|---|---|---|
| 28,818 | Sweden | of 1908 |
| 373,422 | Italy | Apr. 28, 1939 |
| 401,425 | France | July 23, 1909 |
| 468,113 | Great Britain | Oct. 28, 1935 |
| 480,281 | Germany | July 31, 1929 |